Dec. 29, 1970  D. ROSSMAN  3,551,878
TEST CONNECTOR INTEGRATED CIRCUIT MODULE
Filed April 26, 1968  2 Sheets-Sheet 1
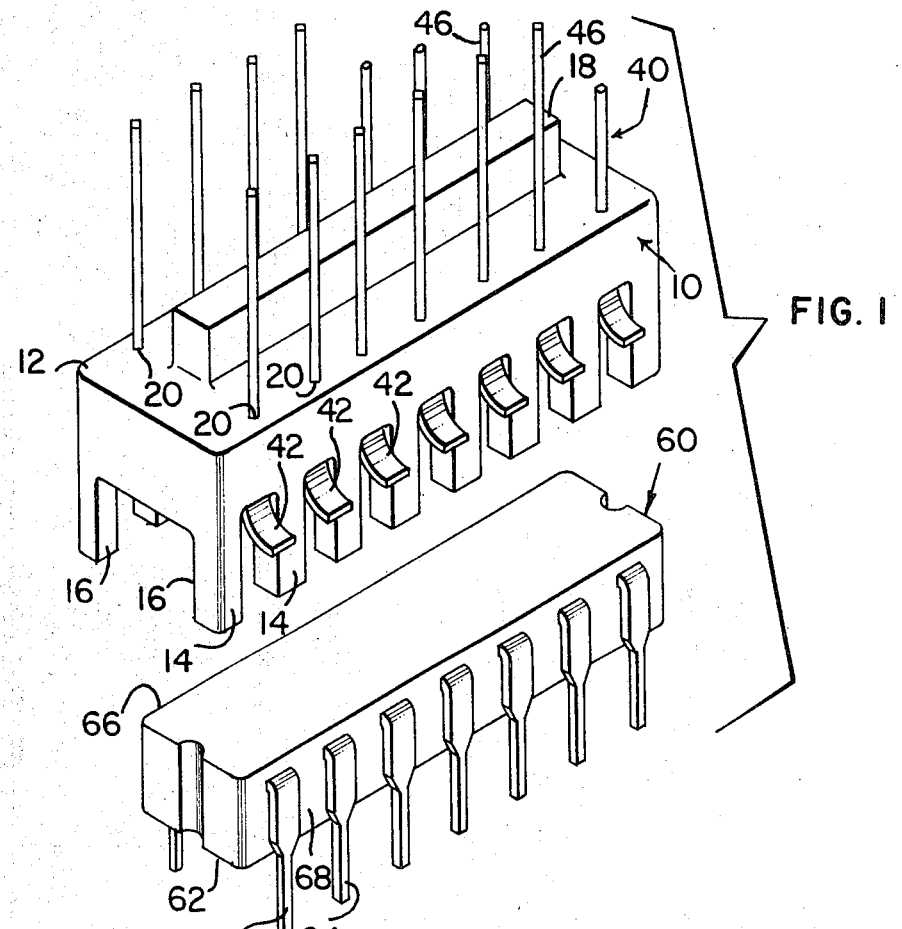
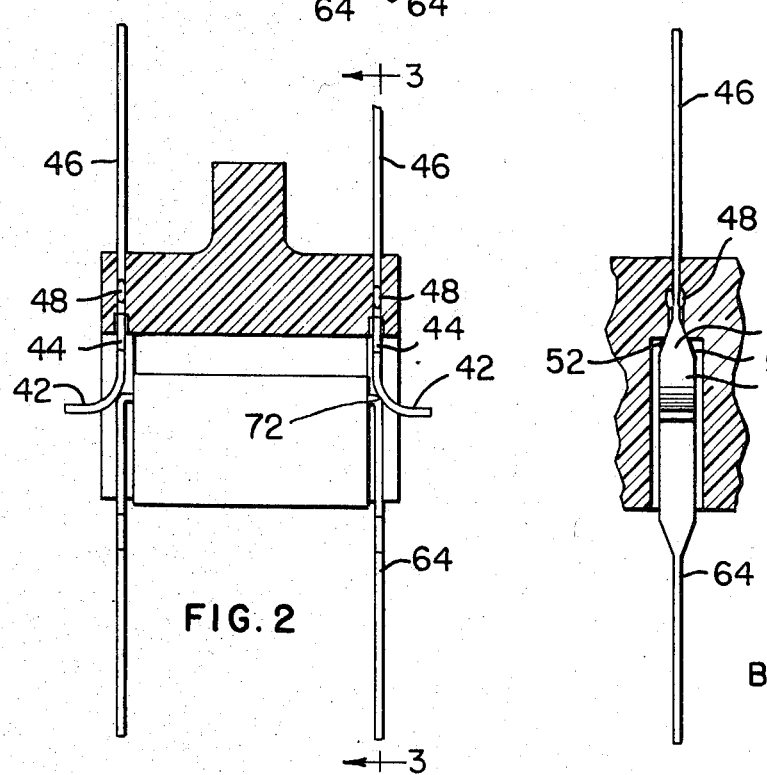
INVENTOR.
DONALD ROSSMAN
BY Martin L. Faigus
ATTORNEY.

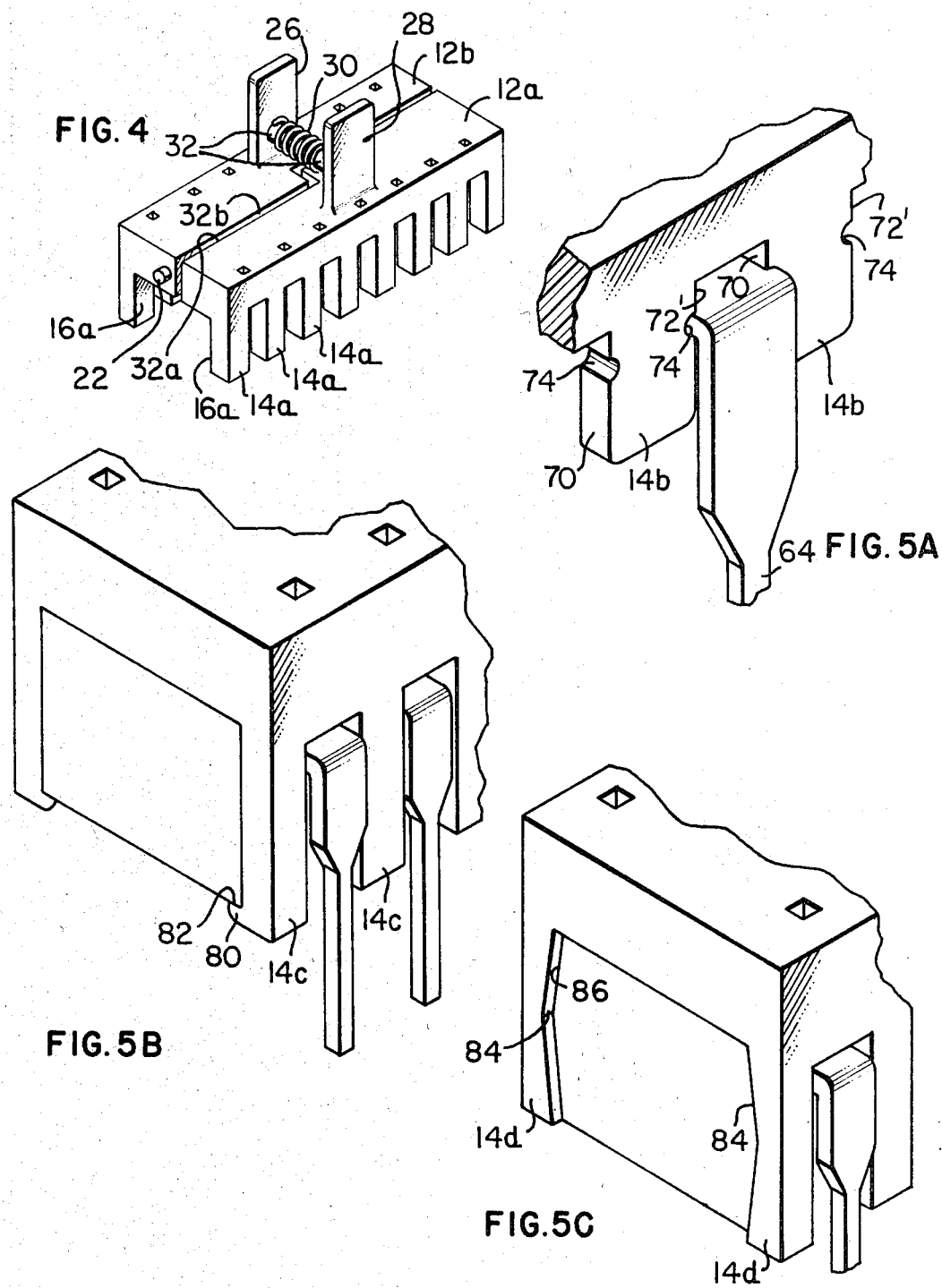

United States Patent Office 3,551,878
Patented Dec. 29, 1970

3,551,878
TEST CONNECTOR FOR INTEGRATED CIRCUIT MODULE
Donald Rossman, Jenkintown, Pa., assignor to Elco Corporation, Willow Grove, Pa., a corporation of Delaware
Filed Apr. 26, 1968, Ser. No. 724,549
Int. Cl. H01r *13/54*
U.S. Cl. 339—75  5 Claims

ABSTRACT OF THE DISCLOSURE

An electrical connector for use in testing circuitry of an integrated circuit module has a pair of pivotally interconnected elements, each of which has fingers for engaging the insulating body of the integrated circuit module between its leads to releasably retain said connector to said module. Electrical contacts in each element make electrical connections with the respective leads of the module.

---

This invention relates generally to an electrical connector for use in testing circuitry of integrated circuit modules, and more specifically to an electrical connector for use in testing circuitry of dual-in-line packages (D-I-P's).

A dual-in-line package is one in which an integrated circuit wafer is encapsulated in an insulating body that is generally parallelipiped in shape with dimensions of approximately ⅛" x ¼" x ¾". Each dual-in-line package has 16 leads, or more, arranged on 0.100 inch centers in two parallel rows at opposite longitudinal sides of the body of the package. These leads, where they exist from the insulating body of the package are generally rectangular with dimensions approximately 0.060" x 0.12"; and a short distance from the body the leads are reduced in size to about 0.022" x 0.12". The structure of a dual-in-line package permits the tiny, difficult to handle integrated circuit wafer contained therein, to be handled easily, either manually or automatically. The leads which exit from the insulating body of the package are strong enough to permit the package to be mounted directly into a socket of a circuit board.

This invention relates to a test connector for use in testing the electrical circuitry in dual-in-line packages while such packages are in service in electronic equipment. Suitable electrical connectors have been developed for testing the circuitry in integrated circuit modules when such modules are not in service. Or an example of such a connector, see Pat. No. 3,377,514, issued to H. E. Ruehlemann et al. on Apr. 9, 1968. To date, the testing of circuitry in integrated circuit modules while such modules are in service has been accomplished mainly by electrically connecting one end of a test probe to suitable testing apparatus, and manually holding the other end of said test probe in contact with a lead projecting from the insulating body of the integrated circuit module. The test probe is held in contact with the lead as close to the body of the module as dimensions of the system will permit. The reason for making the test connection as close to the body of the integrated circuit module as possible, is to eliminate the electrical characteristics of the leads from the test system.

Utilizing a test probe for testing integrated circuit modules while they are in service necessitates moving the test probe from lead to lead to another lead, in order to test the electrical circuitry of the module associated with each lead. Such a procedure is extremely laborious.

The problems outlined above are alleviated by the electrical connector of this invention. The electrical connector of this invention is comprised of an insulating member which has retaining means in the form of fingers for holding and retaining the electrical connector in operative position on a dual-in-line package. A plurality of electrical contacts are mounted in the insulating member, and each contact is positioned to make electrical connection with a respective lead of the dual-in-line package. Each contact in the electrical connector has a tail section which is adapted to be electrically connected to suitable test apparatus, and a wiping finger which makes electrical connection with a respective lead of the dual-in-line package adjacent the insulating body member of said package. This arrangement permits accurate testing of the integrated circuitry which is connected to each lead of the dual-in-line package without the necessity of moving the test connector.

The more important features of this invention have thus been outlined rather broadly in order that the detailed description thereof that follows may be better understood, and in order that the contribution to the art may be better appreciated. There are, of course, additional features of the invention that will be described hereinafter and which will also form the subject of the claims appended hereto. Those skilled in the art will appreciate that the conception upon which this disclosure is based will readily be utilized as a basis for designing other structures for carrying out the several purposes of this invention. It is important, therefore, that the claims to be granted herein shall be interpreted with sufficient breadth to prevent the appropriation of this invention by those skilled in the art.

Other objects of the invention and its many attendant advantages will be readily appreciated as the invention becomes better understood with reference to the following detailed description when considered in connection with the accompanying drawings, wherein:

FIG. 1 is a perspective view of the electrical connector of this invention and a dual-in-line package to which such a connector can be attached;

FIG. 2 is a sectional view taken through the electrical connector in its operative position on a dual-in-line package showing the electrical connection between the wiping finger of a contact in the electrical connector, and a lead projecting from the insulating body of the dual-in-line package;

FIG. 3 is a sectional view taken along 3—3 of FIG. 2;

FIG. 4 is a perspective view of a modified electrical connector of this invention with the contact removed for purpose of clarity;

FIGS. 5A, 5B, and 5C show alternative finger structures for retaining the electrical connector in operative position with respect to a dual-in-line package.

FIG. 1 shows a test connector 10 disassembled from dual-in-line package 60 in order to reveal details of construction of both the test connector and the dual-in-line package. The test connector 10 of this invention is comprised of an insulating member 12 which is preferably made from a flexible thermoplastic material such as nylon or Texan. Retaining means in the form of fingers 14 are integrally molded with insulating member 12. Fingers 14 have inner flat surfaces 16 for engaging first and second longitudinal side walls 66 and 68 of the dual-in-line package 60 in the regions such as 68 between leads 64 of said dual-in-line package. The insulating member 12 of test connector 10 is provided with a holding means in the form of a rib member 18 to facilitate handling of said connector, and also with a plurality of openings 20 for receiving a plurality of electrical contacts 40 in the region between each pair of fingers 14.

The electrical contacts 40 are made from a suitable electrically conducting material, such as beryllium copper or phosphor bronze, and are preferably formed by swaging wire stock. The nose section of each contact 40 is in the form of a wiping finger 42 for making electrical connection with the rectangular portion 72 of a respective lead 64 of the dual-in-line package 60 (FIG. 2). Each electrical contact 40 has a transition portion 44 (FIGS. 2 and 3) which integrally connects the wiping finger 42 to the tail section 46 of the contact. The transition portion of the contact has a section modulus that uniformly increases in a direction toward the tail section 46 and has side surfaces 50 and 52 which are inclined toward each other in a direction from the wiping finger 42 to the tail section 46. The tail section of the contact can be of any convenient shape to receive a lead. The tail section 46 specifically disclosed in this application is of a square cross-section and is adapted to receive an electrically conducting lead wrapped about the outer periphery thereof. However, other terminations, such as a solder-type termination, can be utilized. Further details of construction of a swaged wire contact suitable for use in the connector of this invention are disclosed in U.S. patent application Ser. No. 625,854, filed Mar. 24, 1967, the subject matter of which is incorporated by reference.

Each contact 40 is assembled with the insulating member 12 of the test connector 10 by inserting each contact from the underside of insulating member 12. Upward movement of each contact 40 is limited by frictional engagement between inclined side surfaces 50 and 52 of the transition portion 44 and the inner surface of a respective opening 20 which is provided in the insulating member 12 (FIG. 3). To firmly retain each contact within the insulating member 12, the tail section 46 can be twisted through an angle of 22° to 90° in the region adjacent the upper surface of insulating member 12. The twisting of tail section 46 provides twist shoulders on the tail section which engage the upper surface of insulating member 12 to firmly retain each contact within its corresponding opening 20. As an alternative to twisting the tail section each contact can be provided with bumps 48 which will dig into and provide frictional engagement with the insulating member 12 of the test connector 10 (FIG. 2). Alternatively, the tail 46 can be both twisted and provided with bumps to insure firm retention of each contact within the insulating member 12. It is understood that other methods may be utilized to retain each contact within the insulating member, the particular method being dictated by the structure of the contact which is utilized in the test connector of this invention.

A second embodiment of this invention is shown in FIG. 4 and has the contacts omitted to clearly illustrate the details of construction of the insulating member. The test connector of FIG. 4 differs from that disclosed in FIG. 1 in that the insulating member is comprised of two parts 12a and 12b. Parts 12a and 12b are provided with mating stepped surfaces 32a and 32b respectively, and a pivot pin 22 is utilized to pivotally interconnect the two parts 12a, 12b of such insulating member. Part 12a of the insulating member is provided with an upstanding integral projection 28, and part 12b of the insulating member is provided with an upstanding, integral projection 26, said projections having inwardly facing hubs 32 integrally molded therewith. A compression spring 30 is provided between the projections 26 and 28 and is held in position between such projections by mounting the spring over the inwardly facing hubs. The remaining structure of the electrical connector disclosed in FIG. 4 is identical with that disclosed in FIG. 1.

When it is desired to interconnect the test connector disclosed in FIG. 4 with a dual-in-line package, an operator merely pinches the two projections 26, 28 toward each other, positions the connector in operative position on the dual-in-line package, and releases the pinching force on the projections. After releasing the pinching force on the projection, the inner flat surface 16a of each finger 14a will provide frictional engagement with its corresponding longitudinal side surface 66, 68 of the dual-in-line package to properly retain the electrical connector in operative position on the dual-in-line package.

FIGS. 5A–C show alternative finger structures which can be utilized in the test connectors disclosed in FIGS. 1 and 4. The retaining means disclosed in FIG. 5A are in the form of fingers 14b which are provided with side surfaces 70 and 72'. Each side surface which in operation is designed to be positioned adjacent a lead 64 of the dual-in-line package is provided with a recess 74 which receives the side surface of an adjacent contact therein, as indicated. This structural arrangement firmly retains the test connector to the dual-in-line package.

A further embodiment of retaining means is disclosed in FIG. 5B, and is composed of fingers 14c having a transverse lower portion 80. When the test connector 10 is positioned on the dual-in-line package, the upper surface 82 of transverse lower portion 80 of each finger will snap into engagement with the underside of insulating body member of the dual-in-line package. The fingers 14c firmly retain the electrical connector to the dual-in-line package.

FIG. 5C shows another embodiment of retaining means which is specifically designed to be utilized with a dual-in-line package having convex V-shaped longitudinal side surfaces 86. The retaining means are in the form of fingers 14d having convex V-shaped inner surfaces 84 to firmly retain the test connector to the dual-in-line package.

I claim:

1. An electrical connector for use in testing circuitry of an integrated circuit module which has an insulating body encapsulating said circuitry, said insulating body having opposed side surfaces with leads projecting therefrom and electrically connecting to said circuitry, comprising:
   (a) an insulating member having two separate elements which are pivotally interconnected, each of said elements having gripping means to enable an operator to pivot said elements with respect to each other for permitting easy assembly of said insulating member with said integrated circuit module;
   (b) at least one electrical contact mounted in said insulating member and positioned therein to make electrical connection with a lead projecting from said circuit module when said insulating member is held in its operative poistion with respect to said circuit module; and
   (c) retaining means associated with said insulating member for releasably holding the latter in its operative position with respect to said integrated circuit module.

2. The electrical connector of claim 1, wherein said retaining means comprise fingers integral with and extending from each of said two separate elements for engaging said opposed side surfaces of said insulating member.

3. The electrical connector of claim 2 wherein each of said fingers has a lower transverse portion for engaging the bottom surface of the insulating member of the integrated circuit module.

4. The electrical connector of claim 2, wherein said opposed side surfaces of said insulating member are V-shaped and each of said fingers has a V-shaped surface for engaging the V-shaped side surfaces of said insulating member.

5. The electrical connector of claim 2 wherein said retaining means also includes spring means to bias the fingers of said two separate elements toward one another.

References Cited

UNITED STATES PATENTS

| | | | |
|---|---|---|---|
| 2,120,103 | 6/1938 | Linde | 339—147(P) |
| 2,261,761 | 11/1941 | Hanson et al. | 339—147(P) |
| 3,323,023 | 5/1967 | Walker | 339—17(CF)X |
| 3,345,541 | 10/1967 | Cobaugh et al. | 339—17(CF)X |
| 3,441,853 | 4/1969 | Bodine | 339—17(CF)X |

MARVIN, A. CHAMPION, Primary Examiner

P. A. CLIFFORD, Assistant Examiner

U.S. Cl. X.R.

339—17, 176

PO-1050
(5/69)

UNITED STATES PATENT OFFICE
CERTIFICATE OF CORRECTION

Patent No. 3,551,878            Dated February 23, 1971

Inventor(s) D. Rossman

It is certified that error appears in the above-identified patent and that said Letters Patent are hereby corrected as shown below:

In the drawings, sheets 1 and 2, in the title, after "CONNECTOR" the word --FOR-- should be inserted.

Col. 1, line 33, "exist" should be --exit--.
Col. 2, line 66, "Ixean" should be --Lexan--.
Col. 4, line 47, "connecting" should be --connected--.

Signed and sealed this 15th day of June 1971.

(SEAL)
Attest:

EDWARD M. FLETCHER, JR.          WILLIAM E. SCHUYLER, JR.
Attesting Officer                 Commissioner of Patents